United States Patent
Waisbard et al.

(10) Patent No.: US 9,918,143 B2
(45) Date of Patent: Mar. 13, 2018

(54) SHUFFLED MEDIA CONTENT

(71) Applicant: Cisco Technology, Inc., San Jose, CA (US)

(72) Inventors: Erez Waisbard, Or-Yehuda (IL); Dan Revital, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/749,667

(22) Filed: Jun. 25, 2015

(65) Prior Publication Data
US 2016/0191853 A1 Jun. 30, 2016

(30) Foreign Application Priority Data
Dec. 24, 2014 (IL) .......................................... 236440

(51) Int. Cl.
| | |
|---|---|
| *H04N 7/167* | (2011.01) |
| *H04N 21/8358* | (2011.01) |
| *H04N 21/435* | (2011.01) |
| *H04N 21/2347* | (2011.01) |
| *H04N 21/235* | (2011.01) |
| *H04N 21/266* | (2011.01) |

(52) U.S. Cl.
CPC ..... *H04N 21/8358* (2013.01); *H04N 21/2347* (2013.01); *H04N 21/2351* (2013.01); *H04N 21/26613* (2013.01); *H04N 21/4353* (2013.01)

(58) Field of Classification Search
CPC ..... H04N 21/2347; H04N 21/28; H04H 20/28
See application file for complete search history.

(56) References Cited

U.S. PATENT DOCUMENTS

| | | | | |
|---|---|---|---|---|
| 5,321,748 A | * | 6/1994 | Zeidler | H04N 7/1696 348/E7.059 |
| 5,535,275 A | * | 7/1996 | Sugisaki | H04N 5/913 380/203 |
| 5,757,922 A | * | 5/1998 | Shiroshita | H04L 63/0428 380/37 |

(Continued)

FOREIGN PATENT DOCUMENTS

| | | |
|---|---|---|
| EP | 001464174 | 2/2012 |
| IN | 200500628 I1 | 1/2007 |

OTHER PUBLICATIONS

Anderson, Ross et al; Chameleon—A New Kind of Stream Cipher; (Jan. 1, 1997); Fast Software Encryption Lecture Notes in Computer Science vol. 1267, 1997, pp.

(Continued)

*Primary Examiner* — Junior Mendoza
(74) *Attorney, Agent, or Firm* — Samuel M. Katz

(57) ABSTRACT

In one embodiment, a method for providing media content implemented on a broadcast headend includes defining at least one metablock of media content according to a number of media content data blocks, where the media content data blocks are ordered in accordance with associated serial numbers, reordering the media content data blocks in the at least one metablock of media content to generate reordered data blocks, obfuscating the associated serial numbers in the reordered data blocks, providing details of the reordering to a receiving device, and transmitting the reordered data blocks to a receiving device.

16 Claims, 5 Drawing Sheets

(56) References Cited

U.S. PATENT DOCUMENTS

| | | | |
|---|---|---|---|
| 5,815,572 A * | 9/1998 | Hobbs | H04N 7/1716 348/E7.059 |
| 6,351,538 B1 * | 2/2002 | Uz | H04N 5/913 348/E7.056 |
| 7,124,303 B2 | 10/2006 | Candelore et al. | |
| 2002/0002674 A1 | 1/2002 | Grimes et al. | |
| 2005/0193205 A1 * | 9/2005 | Jacobs | G06F 21/10 713/176 |
| 2005/0216752 A1 | 9/2005 | Hofmeyr et al. | |
| 2009/0228700 A1 | 9/2009 | Hubbell | |
| 2010/0189257 A1 * | 7/2010 | Bjorkengren | H04L 9/34 380/236 |
| 2012/0082310 A1 * | 4/2012 | Rashkovskiy | H04N 21/26613 380/210 |
| 2012/0155233 A1 * | 6/2012 | Spitzlinger | G06F 21/10 369/30.09 |
| 2013/0024901 A1 * | 1/2013 | Sharif-Ahmadi | G06F 17/30017 725/114 |
| 2013/0170695 A1 * | 7/2013 | Anan | G06T 1/0021 382/100 |

OTHER PUBLICATIONS

IETF—RFC 6904; Encryption of Header Extensions in the Secure Real-Time Transport Protocol (SRTP)—RFC 6904 (Apr. 2013).

* cited by examiner

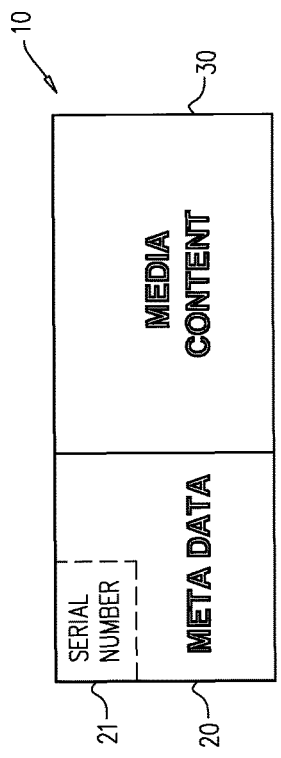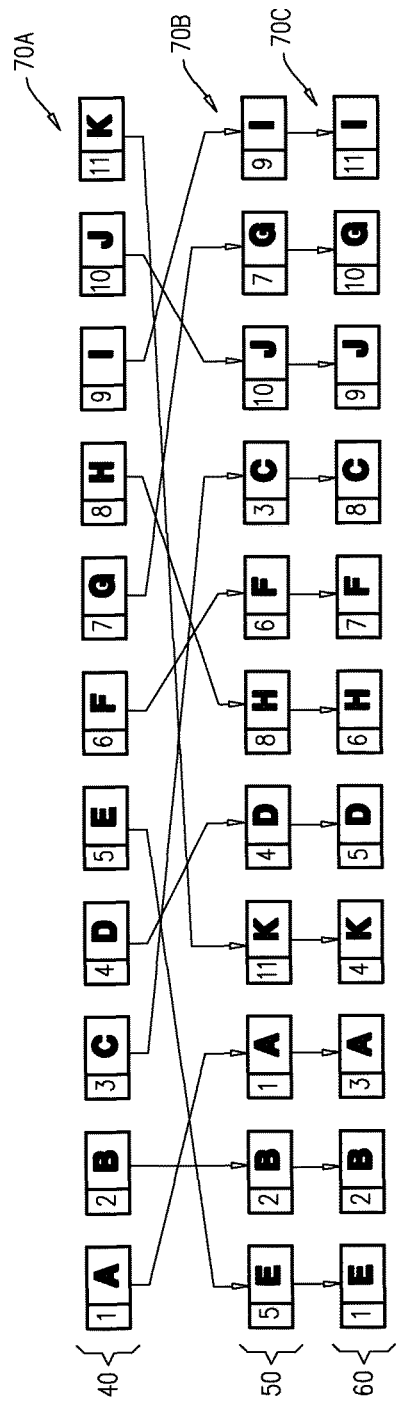

| 5 | 2 | 1 | 11 | 4 | 8 | 6 | 3 | 10 | 7 | 9 |
|---|---|---|----|---|---|---|---|----|---|---|
| 7 | 11 | 6 | 1 | 5 | 2 | 10 | 3 | 4 | 9 | 8 |
| 11 | 3 | 1 | 10 | 9 | 4 | 7 | 8 | 2 | 6 | 5 |
| 10 | 1 | 9 | 7 | 6 | 2 | 8 | 3 | 5 | 4 | 11 |
| 7 | 2 | 10 | 11 | 1 | 3 | 4 | 9 | 6 | 5 | 8 |
| 6 | 8 | 4 | 10 | 2 | 1 | 7 | 3 | 9 | 11 | 5 |
| 4 | 3 | 10 | 9 | 5 | 2 | 7 | 11 | 1 | 6 | 8 |
| 4 | 11 | 5 | 6 | 3 | 10 | 2 | 7 | 9 | 8 | 1 |
| 1 | 7 | 6 | 5 | 11 | 8 | 4 | 10 | 9 | 3 | 2 |
| 11 | 6 | 5 | 4 | 1 | 2 | 3 | 7 | 8 | 10 | 9 |
| 8 | 7 | 3 | 4 | 6 | 2 | 1 | 5 | 11 | 9 | 10 |
| 6 | 7 | 4 | 5 | 11 | 3 | 9 | 8 | 10 | 1 | 2 |
| 2 | 1 | 8 | 6 | 7 | 4 | 3 | 11 | 5 | 10 | 9 |
| 8 | 7 | 5 | 6 | 11 | 4 | 10 | 1 | 3 | 2 | 9 |
| 8 | 11 | 7 | 1 | 9 | 6 | 3 | 5 | 10 | 4 | 2 |

FIG. 4

SHUFFLED MEDIA CONTENT

RELATED APPLICATION INFORMATION

The present application claims the benefit of priority from IL Patent Application, serial number 236,440, filed on Dec. 24, 2014.

FIELD OF THE INVENTION

The present invention generally relates to the prevention of unauthorized access to media content.

BACKGROUND OF THE INVENTION

The broadcast of media content is known in the art. The digital signals of a media content data stream are typically organized into blocks of data (hereinafter "blocks") for broadcast to receiving devices. The blocks typically comprise both media content data, i.e. audio and/or video signals, and metadata which is associated with the video content. The blocks of a broadcast media content data stream are not necessarily received in the same order that they are broadcast. Accordingly, the metadata typically comprises a serial number which may be used by the receiving device to sort the incoming blocks into the correct order after receipt.

Broadcasters commonly use various encryption schemes to scramble the bits in the blocks in order to prevent unauthorized use of proprietary media content.

BRIEF DESCRIPTION OF THE DRAWINGS

The present invention will be understood and appreciated more fully from the following detailed description, taken in conjunction with the drawings in which:

FIG. 1A is a schematic illustration of an exemplary media content packet, constructed and operative in accordance with an embodiment of the present invention;

FIG. 1B is a schematic illustration of a series of the media content packets of FIG. 1A as processed in accordance with an embodiment of the present invention;

FIG. 4 is a schematic illustration of an exemplary key table populated by the process of FIG. 3.

DESCRIPTION OF EXAMPLE EMBODIMENTS

Overview

Figure 2:
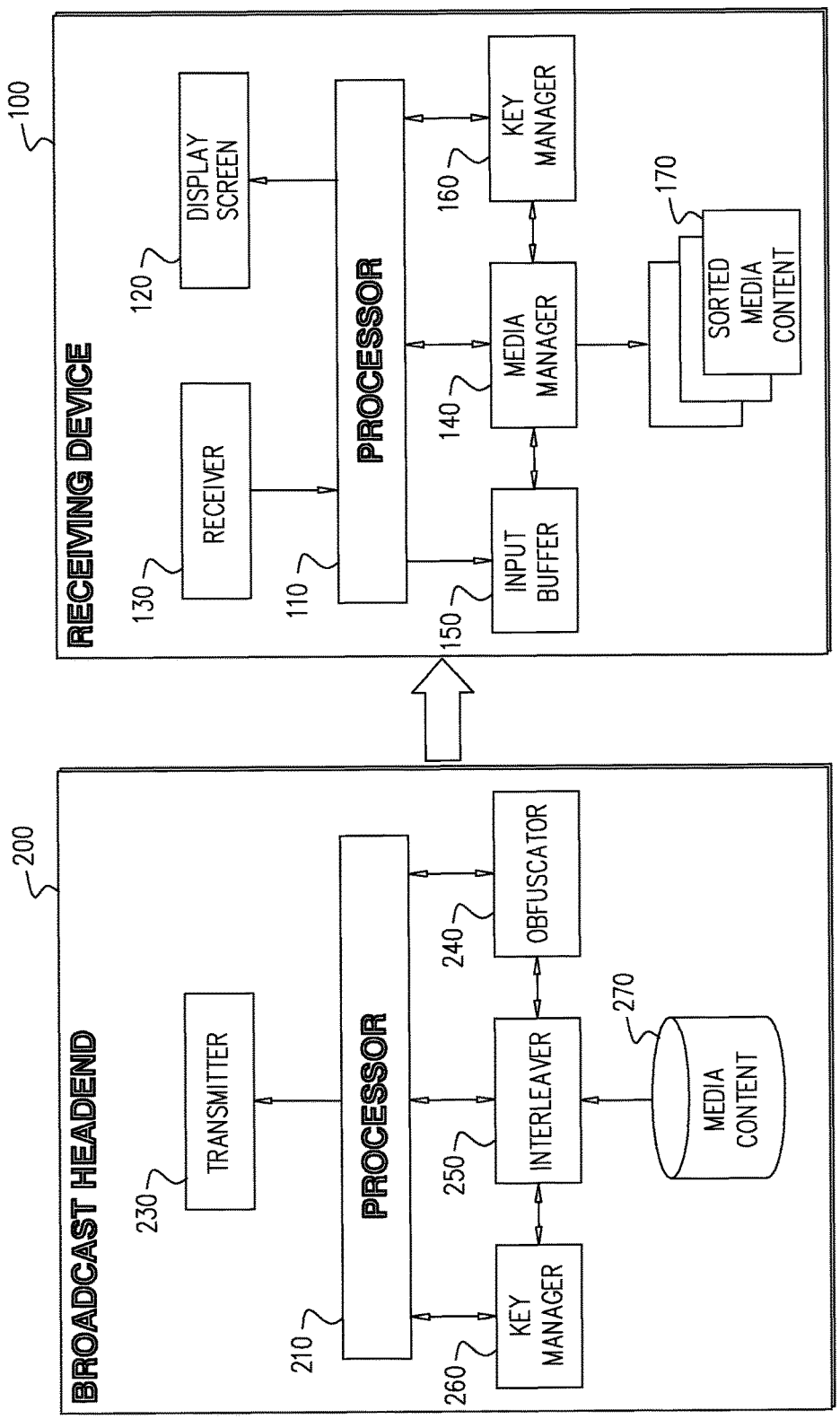
FIG. 2 is a schematic illustration of an exemplary broadcast headend and receiving device, constructed and operative in accordance with an embodiment of the present invention.

A method for providing media content implemented on a broadcast headend includes defining at least one metablock of media content according to a number of media content data blocks, where the media content data blocks are ordered in accordance with associated serial numbers, reordering the media content data blocks in the at least one metablock of media content to generate reordered data blocks, obfuscating the associated serial numbers in the reordered data blocks, providing details of the reordering to a receiving device, and transmitting the reordered data blocks to a receiving device.

A method implemented on a media content receiving device includes receiving unencrypted media content data blocks, where the received unencrypted media content data blocks include an obfuscated serial number and are received in a non-linear order, receiving encrypted details for reordering the received unencrypted media content data blocks, decrypting the encrypted details, and reordering the received unencrypted media content data blocks in accordance with the decrypted details.

Description

It will be appreciated that the use of encryption to protect media content may entail additional processing cycles by both the broadcast headend and a receiving device. It will similarly be appreciated that while the broadcast headend may provide encryption at a single point before broadcast, any processing that may be necessary to decrypt the encrypted media content may be performed on each receiving device separately, thereby effectively multiplying any additional necessary processing by the number of receiving devices in a broadcast system. Such additional processing may negatively impact performance for some low-end receiving devices that typically use software decryption. The additional processing may also increase battery usage for mobile devices.

It is further appreciated that the use of encryption may complicate the implementation of other aspects of video content protection. For example, encryption may make it more difficult to use watermarks for digital rights management, particularly if a third party (external to the broadcaster) may be involved in the implementation. Depending on the methods used, the watermark may be embedded prior to encryption; it therefore may not be identifiable without decryption. Encrypting broadcasts of video content may also frustrate attempts by network operators to analyze their network traffic using deep packet inspection (DPI).

FIG. 1A, to which reference is now made, illustrates an exemplary media content block 10, constructed and operative in accordance with an embodiment of the present invention. Media content block 10 may be, for example, an MPEG packetized elementary stream (PES) packet comprising a 188 byte payload and headers. Media content block 10 comprises media content 30, and metadata 20, which, per the hereinabove example of a PES packet, may generally correspond respectively to the payload and headers. It will be appreciated by those of skill in the art that a single frame of video content may be transmitted using several media content blocks 10, and a typical broadcast of video content may therefore comprise at least thousands of media content blocks 10. It will similarly be appreciated by those of skill in the art that for a given broadcast, media content blocks 10 may not necessarily be received in the same order as they are broadcast. Accordingly, the thousands of media content blocks 10 in a typical broadcast stream may be sorted into their correct order by a receiving device generally as they are received in order to reassemble the underlying content. Therefore, metadata 20 typically comprises serial number 21 which may facilitate the sorting of incoming media content blocks 10 into the correct order as they are received.

It has been observed that it may not be necessary to employ full semantic security to protect broadcast media content. It will be appreciated that media content receiving devices are in any case typically operative to store incoming media content blocks 10 in a holding buffer, and then play them according to associated serial numbers 21. This existing functionality may be leveraged to provide non-encryption based protection of media content without requiring additional processing resources. In accordance with embodiments of the resent invention, serial numbers 21 may be altered to prevent a non-authorized receiver of a broadcast stream from easily reassembling a broadcast stream as it is received. It will be appreciated that for every n media content blocks in a given broadcast stream, there may be n! possible permutations for their correct order, e.g. in a stream of one thousand media content blocks 10, there may be 1×2×3×4 . . . ×1000 different possible orders of the thousand media content blocks 10. If serial numbers 21 are not suitable to facilitate reordering of media content blocks 10, reassembly may be beyond the computing power of a typical receiving device.

Media content blocks 10 may be organized into metablocks, i.e. a group comprising a defined number of media content blocks 10. Reference is now made to FIG. 1B which illustrates an exemplary metablock 70, as it may be processed in accordance with embodiments of the present invention. Metablock 70A comprises a multiplicity of ordered blocks 40, where each ordered block 40 represent one of an ordered series of media content blocks 10 associated with media content. Ordered blocks 40 comprise serial number 21 and media content 30. For ease of reference, each ordered block 40 is numbered from 1-11 respectively to represent an associated serial number 21, and labeled A-K respectively to represent associated media content 30.

Ordered blocks 40 of metablock 70A may be "shuffled" or interleaved to produce shuffled blocks 50 of metablock 70B. Each of shuffled blocks 50 may therefore correspond to an ordered block 40. However, the order in which corresponding shuffled blocks 50 appears may be different than that of ordered blocks 40. For example, the first ordered block 40 (i.e. with serial number 21 "1" and media content 30 "A") may be represented as the third shuffled block 50. Similarly, the fifth ordered block 40 (i.e. with serial number 21 "5" and media content 30 "E") may appear as the first shuffled block 50. It will be appreciated that any suitable algorithm may be used to shuffle ordered blocks 40.

Shuffled blocks 50 may be obfuscated to produce obfuscated blocks 60. Any suitable method may be employed to obfuscate serial numbers 21 to prevent a receiving device from using serial numbers 21 to reorder shuffled blocks. In accordance with an exemplary embodiment of the present invention, obfuscated blocks 60 may be produced by renumbering serial numbers 21 in accordance with order of shuffled blocks 50, such that each serial number 21 may be assigned a number in accordance with the position of its associated shuffled block 50. For example, serial number 21 of the first shuffled block may be renumbered as "1"; serial number 21 of the second shuffled block 50 may be renumbered "2", and so on. Accordingly, whereas ordered blocks 40 may have a direct relationship between serial number 21 and the correct order in which media content 30 may be played, there may be no similar relationship between serial number 21 and media content 30 for obfuscated blocks 60. A receiving device may not use serial number 21 in obfuscated blocks 60 to reassemble the underlying media content.

In such manner, the underlying media content associated with obfuscated blocks 60 may therefore be protected from unauthorized use, even though obfuscated blocks 60 may be broadcast "in the clear" without encryption. A receiving device may also be configured to play the incoming media content without having to dedicate significant processing resources to decryption; the processing resources required to reorder obfuscated blocks 60 may not be materially different than the processing resources required to buffer and play ordered blocks 40 that may have been broadcast in the clear. A watermark may also be inserted into the underlying media content without necessitating downstream decryption to detect the watermark. Network operators may also be able to monitor the associated data stream using DPI without having to decrypt the component media content blocks 10.

It will be appreciated that the depiction of the number of ordered blocks 40 (i.e. eleven blocks) to be shuffled may have been limited in the interest of clarity. In practice, 20 or more ordered blocks 40 may be shuffled to produce shuffled blocks 50. It will be appreciated by one of skill in the art that the possible permutations of the order of twenty shuffled blocks 50 is: $20!=2.432902 \times 10^{18}$. Accordingly, even though the resulting obfuscated blocks 60 may not be encrypted, i.e. metadata 20 and media content 30 are broadcast "in the clear", the underlying media content may be protected from unauthorized use by virtue of the fact that a receiving device may be required to perform the nontrivial task of first reordering obfuscated blocks 60 before the underlying media content may be viewed. In the absence of the "key", i.e. the algorithm used to shuffle ordered blocks 40 to produce shuffled blocks 50, typical receiving devices may not be capable of reordering obfuscated blocks.

Reference is now made to FIG. 2 which is a schematic illustration of an exemplary broadcast headend 200, operative to provide media content to an exemplary receiving device 100. Broadcast headend 200 comprises processor 210, transmitter 230, obfuscator 240, interleaver 250, key manager 260 and media content database 270. It will be appreciated that broadcast headend 200 may comprise other components such as may be required for the broadcast of media content. It will similarly be appreciated that the depiction of broadcast headend 200 as a single entity with integrated components may be exemplary. In some embodiments of the present invention, the functionalities of some or all of the components of broadcast headend 200 may be distributed in separate units or modules. In accordance with some embodiments of the present invention, some or all of the components of broadcast headend 200 may be cloud-based and accessible via a communications network such as, for example, a LAN, WAN or the Internet. It will also be appreciated that broadcast headend 200 may be configured to broadcast media content to receiving device 100 via any suitable communications network, such as, for example, a satellite based wireless transmission based network, a cable based network, an IP based network, etc.

Broadcast headend 200 comprises hardware and software components, such as are well-known in the art. It will be appreciated that broadcast headend 200 may comprise more than one processor 210. For example, one such processor 210 may be a special purpose processor operative to at least shuffle and renumber media content blocks 10 (FIG. 1A) for broadcast to receiving device 100. Processor 210 may be operative to execute instructions stored in a memory (not shown). Transmitter 230 may be any suitable software or hardware component such as a transceiver or web server that may be operative to use protocols such as are known in the art to send media content and related metadata to receiving device 100.

Interleaver 250 may be a software application that may be executed by processor 210 in order to at least perform a hereinbelow described method to shuffle the order of media content blocks 10. Alternatively, interleaver 250 may be implemented as a hardware component. Obfuscator 240 may be a software application that may be invoked by interleaver 250 and/or executed directly by processor 210 to obfuscate serial numbers 21 (FIG. 1A). Key manager 260 may be a software application that may be invoked by interleaver 250 and/or executed directly by processor 210 to provide one or more keys or other details for reordering obfuscated blocks 60 (FIG. 1B) to receiving device. It will be appreciated that Obfuscator 240 and or key manager 260 may also be implemented as a hardware component.

Receiving device 100 may be any suitable device for receiving and/or viewing media content such as, for example, a set-top box, personal computer, etc. Receiving device 100 comprises hardware and software components, such as are well-known in the art. Receiving device 100 comprises processor 110, display screen 120, receiver 130, media manager 140, input buffer 150, key manager 160 and sorted media content buffer 170. It will be appreciated that receiving device 100 may comprise more than one processor 110. For example, one such processor 110 may be a special purpose processor operative to at least reorder obfuscated blocks 60 (FIG. 1B) received from broadcast headend 200. Processor 110 may be operative to execute instructions stored in a memory (not shown). Receiver 130 may be any suitable software or hardware component such as a modem that may be operative to use protocols such as are known in the art to receive media content and related metadata from broadcast headend 200.

Media manager 140 may be a software application that may be executed by processor 110 in order to at least perform a hereinbelow described method to reorder media content blocks 10 (such as obfuscated blocks 60) received from broadcast headend 200. Alternatively, media manager 140 may be implemented as a hardware component. It will be appreciated that media manager 140 may also comprise additional functionalities for the playing of media content. Input buffer 150 may be a memory buffer suitable for storing media content blocks 10 (FIG. 1A) prior to sorting according to serial numbers 21 and/or any other method. Key manager 160 may be a software application that may be invoked by media manager 140 and/or executed directly by processor 110 to provide one or more keys for reordering obfuscated blocks 60 (FIG. 1B). It will be appreciated that key manager 160 may also be implemented as a hardware component.

Figure 3:
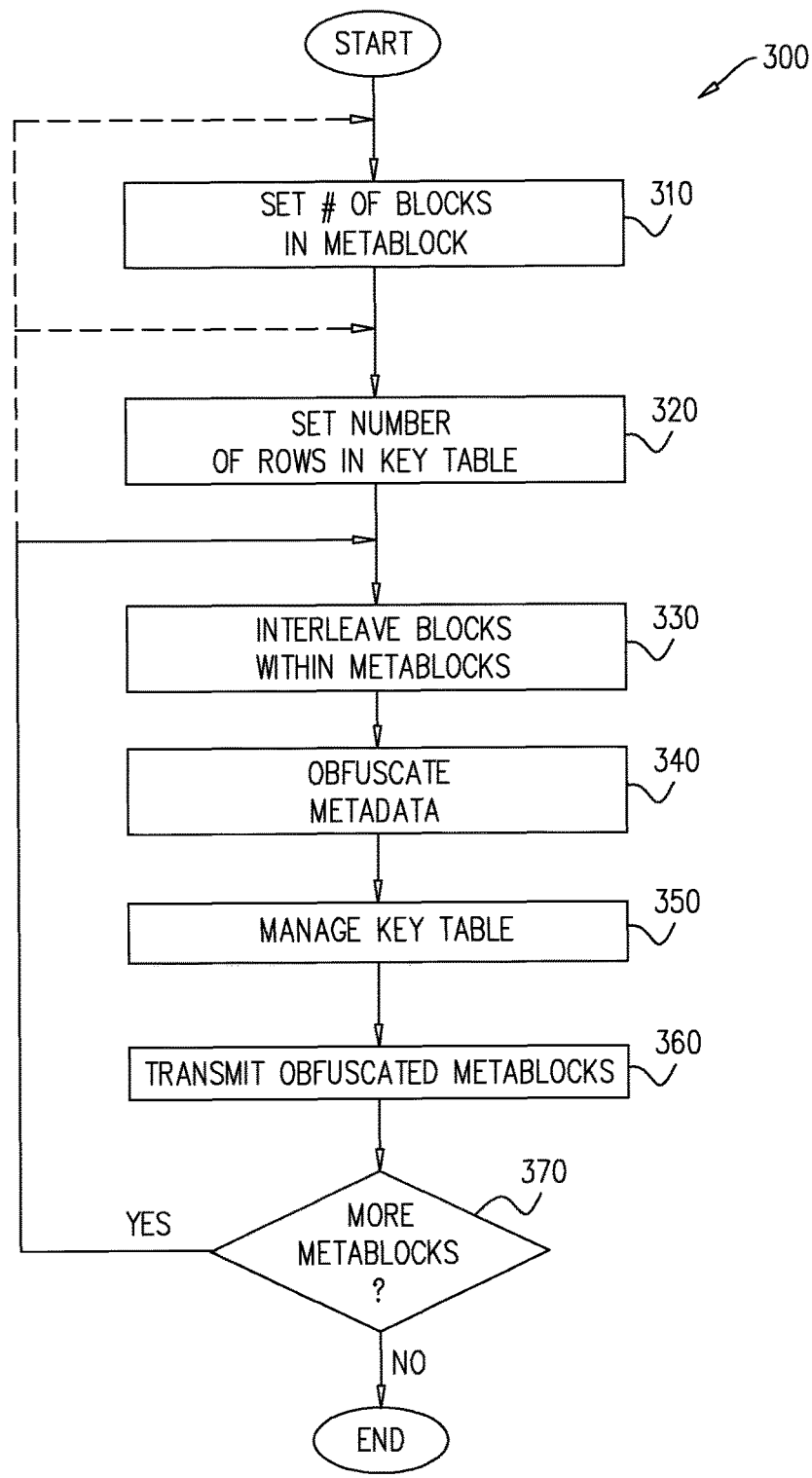
FIG. 3 is a flow chart of a media content shuffling process to be performed by the broadcast headend of FIG. 2.

Reference is now also made to FIG. 3 which illustrates a media content block shuffling process 300 to be performed by broadcast headend 200 (FIG. 2) in accordance with embodiments of the present invention. For illustration, process 300 may be discussed in the context of exemplary ordered blocks 40, shuffled blocks 50 and obfuscated blocks 60 (FIG. 1B). Based on various considerations, such as the delay between original broadcast and viewing of the content, interleaver 250 may set (step 310) a metablock size, i.e. the number of ordered blocks 40 to shuffle in order to produce shuffled blocks 50. For example, as per the exemplary embodiment of FIG. 1B, a metablock size of eleven blocks may have been set, i.e. a metablock of eleven ordered blocks may have been shuffled to generate a metablock of eleven shuffled blocks 50. In practice, interleaver 250 may set a metablock size of twenty, thirty or even more blocks. It will be appreciated that the larger the metablock size, the more difficult it may be to reorder obfuscated blocks 60.

Reference is now made also to FIG. 4 which illustrates an exemplary shuffling key table 400, constructed and operative in accordance with embodiments of the present invention. Shuffling key table 400 comprises key metablocks 410 and key entries 420. The number of key entries 420 in each key block 410 may be defined according to step 310 of process 300. For example, as per the exemplary embodiment of FIG. 1B, there may be eleven key entries 420 per key metablock 410. Key entries 420 in a given key metablock 410 may be populated according to the serial numbers 21 of shuffled blocks 50. By way of illustration, key entries 420 for the first key metablock 410 may be 5, 2, 1, 11, 4, 8, 6, 3, 10, 7 and 9 which may correspond to the serial numbers 21 of shuffled blocks 50 in the exemplary embodiment of FIG. 1B.

Returning to FIG. 3, interleaver 250 may also set (step 320) a number of key metablocks 410 to be included in key table 400, i.e. the number of rows to be included in an instance of key table 400. For example, as per the exemplary embodiment of FIG. 4, there may be fifteen key metablocks 410 in key table 400. In actual practice the number of key metablocks 410 may be a function of a level of desired security (i.e. the higher the number the more secure the underlying media content) and/or available processing resources for both broadcast headend 200 and receiving device 100. A random factor may also be introduced to prevent hackers from applying lessons learned over time to deduce the number of key metablocks 410 in key table 400.

Interleaver 250 may interleave (step 330) ordered blocks 40 to produce shuffled blocks 50. Any suitable interleaving method may be used, for example the order of the blocks may be permutated according to a permutation factor.

Obfuscator 240 may obfuscate (step 340) serial numbers 21 of shuffled blocks 50, thereby producing obfuscated blocks 60. In accordance with embodiments of the present invention, as shown in FIG. 1B, obfuscator 240 may renumber serial numbers 21 in accordance with the order of shuffled blocks 50. However, it will be appreciated that obfuscator 240 may use any known or proprietary method to obfuscate the original values of serial numbers 21.

Key manager 260 may manage (step 350) key table 400 by populating key entries 420 per step the results of step 330. Once key table 400 has been populated, key manager 260 may also send key table 400 to receiving device 100. Key manager 260 may use any known or proprietary method for sending key table 400 via transmitter 230 to receiving device 100 in a generally secure manner. For example, key manager 260 may encrypt key table 400 and send the encrypted version of key table 400 to receiving device 100. It will be appreciated that key manager 260 may use any known or proprietary method for the secure delivery of the decryption key to receiving device 100. It will similarly be appreciated that key manager 260 may use any known or proprietary encryption algorithm such as, for example, AES, 3DES, to encrypt key table 400.

Broadcast headend 200 employs transmitter 230 to transmit (step 360) the blocks of obfuscated blocks 60 to receiving device 100. If there are no more ordered blocks to process (step 370), process 300 may end. Otherwise, control may loop back to step 330.

In accordance with some embodiments of the present invention, key table 400 may be reused continuously throughout a broadcast session. Once all the rows of key table 400 have been populated it may reused as a template for successive iterations of steps 330 and 340. For example, using the exemplary key table 400 for illustration, a broadcast session may be logically split into metablock groups of fifteen metablocks of eleven media content blocks 10 each. Each metablock group may be sorted into its correct order by using the same version of key table 400. A single version of key table 400 may therefore be transmitted to receiving device 100 at, or near, the beginning of the broadcast session, and used continually by receiving device throughout the broadcast session.

Alternatively, the contents of key table 400 may vary during a broadcast session, thereby increasing the protective value of process 300. For example, a different algorithm or key may be used by step 330 on a constant, periodic or random basis, thereby changing the order of shuffled blocks 50, with associated changes in key entries 410.

Alternatively or in addition, the parameters of key table 400 may vary during a broadcast session, thereby further increasing the protective value of process 300. For example, instead of looping back to step 330 from step 370, control may return, on a constant, periodic or random basis, to step 310 where the structure of key table 400 may be adjusted by setting a new number of key entries 420 to be included in each key block 410. Control may then continue to step 320 where the structure of key table 400 may or may not be further adjusted by setting a new number of key blocks 410 to be included in key table 400.

Alternatively or in addition, the number of key blocks 410 may be adjusted without necessarily adjusting the number of key entries in each block. In such a case, control may return directly to step 320 where the structure of key table 400 may be adjusted by setting a new number of key blocks 410 to be included in key table 400.

It will be appreciated by those of skill in the art that the order of the steps of process 300 may be exemplary; other processing flows providing generally the same functionality may also be supported by the present invention. Particularly, steps 310 and 320 may be reordered within the scope of the present invention; steps 330, 340 and 350 may be reordered within the scope of the present invention; and steps 350 and 360 may be re-ordered within the scope of the present invention.

Figure 5:
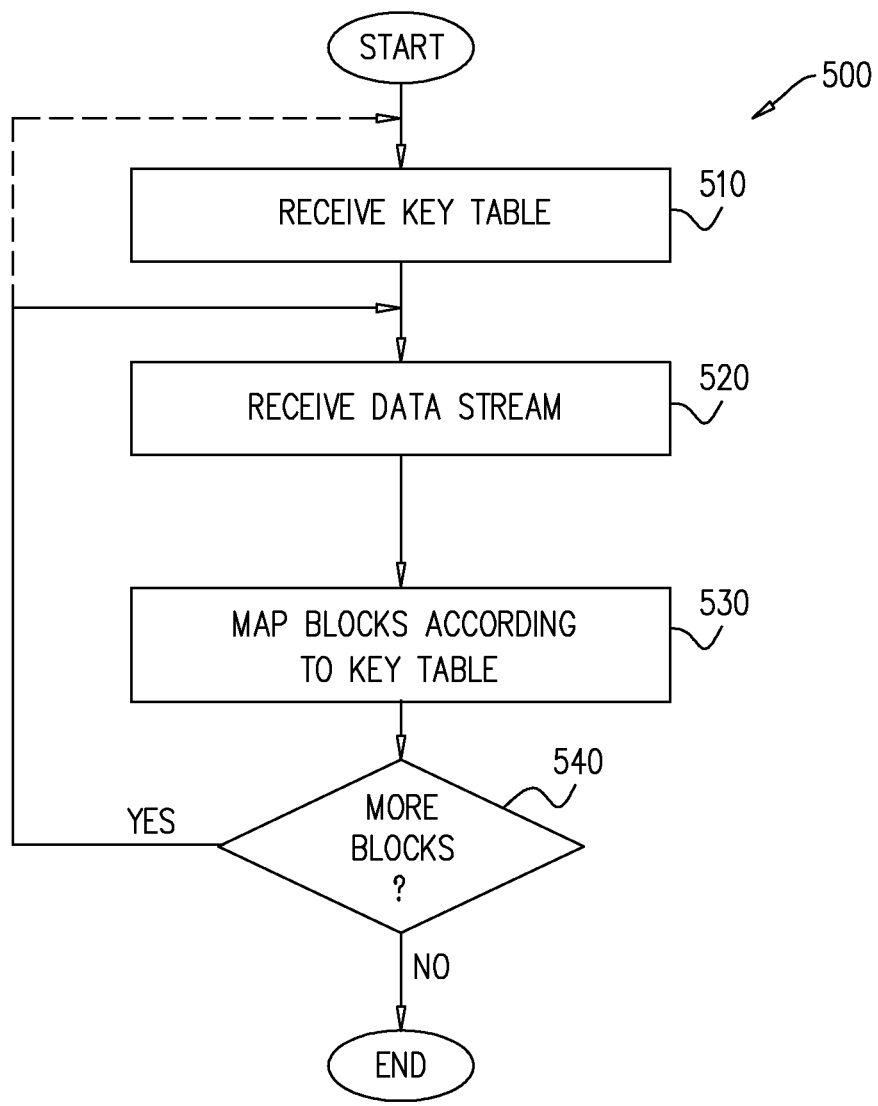
FIG. 5 is a flow chart of a media content packet mapping process to be performed by the receiving device of FIG. 2.

Reference is now made to FIG. 5 which illustrates a media content block mapping process 500 to be performed by the receiving device of FIG. 2 on obfuscated blocks 60 received from broadcast headend 200. Key manager 160 may receive (step 510) key table 400 via receiver 130. It will be appreciated that the received key table 400 may be encrypted. Key manager 160 may be configured to use known or proprietary decryption methods to derive a usable version of key table 400.

Media manager 140 may receive (step 520) a data stream including obfuscated blocks 60 (FIG. 1B) via receiver 130. Media manager 140 may store elements of the data stream in input buffer 150 as they are received.

Media manager 140 may employ key table 400 to map (step 530) obfuscated blocks 60 from input buffer to sorted media content 170. It will be appreciated that such mapping may comprise renumbering the associated serial numbers 21 of obfuscated blocks 60 in accordance with the original order of serial numbers 21 of the original corresponding ordered blocks 40. Alternatively, it will be appreciated that the mapping may entail indexing obfuscated blocks 60 according to their current serial numbers 21 (i.e. the obfuscated serial numbers 21) without renumbering. If there are no more ordered blocks to process (step 540), process 500 may end. Otherwise, control may loop back to step 520.

As disclosed hereinabove, in accordance with some embodiments of the present invention, key table 400 may be sent to receiving device 100 multiple times during a given broadcast session. In accordance with such embodiments, control may also return to step 510 as necessary to receive a new version of key table 400.

It will be appreciated by one of skill in the art that process 300 and process 500 may also support the shuffling and reordering of other sizes or types of media content data units. For example, processes 300 and 500 may process IP packets in generally the same manner as PES packets. Media content data blocks 10 may generally be representative of any data convention suitable for the transport of media content.

It will also be appreciated that the disclosed systems and methods may generally be suitable for protecting data streams of significant size where the protection is desired for an aggregate representation that typically spans multiple data blocks. It may be less suitable for protecting data streams where granular details such as, for example, account numbers, passwords and the like may be harvested from a single data block if it were to be broadcast in the clear.

It will similarly be appreciated by one of skill in the art that a hacker may be able to derive the shuffling key(s)/algorithm(s) used for a given media content item by comparing the obfuscated blocks with an original copy of the media content item. However, in such a case, any protection afforded by the herein described methods and systems would in any case be superfluous, as the hacker may already be in possession of the protected media content item. In such a case, reordering the broadcast version may be irrelevant.

It will also be appreciated that the herein described methods and systems may be particularly useful for protecting live broadcast events such as, for example, a sports event or a live concert. Theoretically, given enough time, a hacker with the proper resources may piece together an original media content item from obfuscated blocks 60. However, this may be of little value for live broadcast events where real time (or near real time) playing of the media content may be most preferable.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for providing linear media content, the method implemented on a broadcast headend and comprising:

organizing said linear media content associated with a live broadcast event as a plurality of metablocks of media content, wherein each of said plurality of metablocks comprises a number of media content data blocks, wherein said media content data blocks are ordered within said metablocks in accordance with associated serial numbers;

inserting a watermark in at least one unencrypted media content block, wherein said at least one unencrypted media content block is at least one of said media content blocks;

reordering said media content data blocks in at least one of said metablocks of media content to generate reordered data blocks;

obfuscating said associated serial numbers in said reordered data blocks;
providing details of said reordered data blocks to a receiving device; and
transmitting said reordered data blocks from said broadcast headend to said receiving device.

2. The method according to claim 1 and wherein said providing comprises encrypting said details.

3. The method according to claim 1 further comprising enabling deep packet inspection of said transmitted reordered data blocks.

4. The method according to claim 1 and also comprising:
defining at least one additional metablock according to a different number of said media content data blocks; and
performing said reordering, obfuscating, providing and transmitting for said at least one additional metablock.

5. The method according to claim 1 and wherein said details are associated with more than one of said metablocks of media content.

6. The method according to claim 1 and wherein said obfuscating comprises renumbering said serial numbers in accordance with said reordering.

7. The method according to claim 1 and wherein said details of reordering comprise keys for reassembling said media content data blocks in a correct order after said reordering and obfuscating are performed.

8. The method according to claim 1 and also comprising:
defining a number of said metablocks for a metablock processing group; and
performing a first said reordering for said metablocks in a first said metablock processing group.

9. The method according to claim 8 and also comprising:
performing a second said reordering for said metablocks in at least a second said metablock processing group;
wherein said second reordering is performed in accordance with said details of reordering from said first reordering.

10. The method according to claim 8 and also comprising:
performing a second said reordering for said metablocks in at least a second said metablock processing group;
wherein said details of reordering from said second reordering are not in accordance with said details of reordering from said first reordering.

11. The method according to claim 8 and also comprising:
defining a different number of said metablocks in at least a second said metablock processing group; and
performing a second said reordering for said metablocks in at least said second said metablock processing group.

12. The method according to claim 1 and wherein said media content data blocks are MPEG packetized elementary stream (PES) packets.

13. The method according to claim 1 and wherein said media content data blocks are IP packets.

14. A method implemented on a media content receiving device for receiving linear media content, the method comprising:
receiving said linear media content from a broadcast headend, wherein said linear media content is associated with a live broadcast event and comprises a plurality of metablocks of media content, each of said plurality of metablocks comprising unencrypted media content data blocks, wherein said unencrypted media content data blocks comprise an obfuscated serial number and are received in a non-linear order;
receiving encrypted details for reordering said unencrypted media content data blocks within said plurality of metablocks;
decrypting said encrypted details;
reordering said unencrypted media content data blocks within said plurality of metablocks in accordance with said decrypted details; and
detecting a watermark in said unencrypted media content blocks.

15. The method according to claim 14 and also comprising:
receiving additional encrypted details;
decrypting said additional encrypted details; and
reordering said received unencrypted media content data blocks in accordance with said additional decrypted details.

16. A broadcast headend system comprising:
an interleaver configured to:
define at least one metablock of unencrypted linear media content associated with a live broadcast event according to a number of media content data blocks, wherein said media content data blocks are ordered in accordance with associated serial numbers, and
reorder said data blocks in said at least one metablock of media content to generate reordered media content data blocks;
an obfuscator configured to obfuscate said associated serial numbers;
a key manager configured to provide details of said reordering to a receiving device; and
a transmitter configured to transmit said reordered data blocks to a receiving device, wherein at least one watermark is inserted in at least one of said reordered data blocks.

* * * * *